United States Patent
Li et al.

(10) Patent No.: US 8,687,387 B2
(45) Date of Patent: Apr. 1, 2014

(54) QUASI-RESONANT CONTROLLED SWITCHING REGULATOR AND THE METHOD THEREOF

(75) Inventors: Yike Li, Chengdu (CN); Rui Wang, Chengdu (CN); En Li, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 201 days.

(21) Appl. No.: 13/218,361

(22) Filed: Aug. 25, 2011

(65) Prior Publication Data

US 2012/0049822 A1   Mar. 1, 2012

(30) Foreign Application Priority Data

Aug. 27, 2010   (CN) .......................... 2010 1 0270040

(51) Int. Cl.
*H02M 3/335*   (2006.01)
(52) U.S. Cl.
USPC .................... 363/21.13; 363/21.12; 363/21.18
(58) Field of Classification Search
USPC ............ 363/21.02, 21.04, 21.05, 21.1, 21.11, 363/21.12, 21.13, 21.18
See application file for complete search history.

(56) References Cited

U.S. PATENT DOCUMENTS

| | | | |
|---|---|---|---|
| 6,989,997 B2 | 1/2006 | Xu et al. | |
| 7,215,107 B2 * | 5/2007 | Djenguerian et al. | 323/284 |
| 7,423,388 B2 | 9/2008 | Meng | |
| 7,791,909 B2 | 9/2010 | Koo et al. | |
| 7,876,085 B2 | 1/2011 | Hung et al. | |
| 7,898,823 B2 | 3/2011 | Wu | |
| 8,339,816 B2 * | 12/2012 | Saji | 363/21.16 |
| 2010/0219802 A1 | 9/2010 | Lin et al. | |
| 2010/0265742 A1 | 10/2010 | Hu et al. | |
| 2011/0002147 A1 * | 1/2011 | Fukui | 363/21.12 |
| 2011/0007526 A1 | 1/2011 | Zhang et al. | |

* cited by examiner

*Primary Examiner* — Nguyen Tran
(74) *Attorney, Agent, or Firm* — Perkins Coie LLP

(57) ABSTRACT

A frequency limitation method used in a quasi-resonant controlled switching regulator is disclosed. The switching frequency is limited by setting a minimum time period, such as a minimum switching period or a minimum OFF time period. The minimum time period is varying according to the difference between the minimum time period of the previous cycle and an offset value, so as to eliminate the audible noise caused by the frequency hopping when the minimum OFF time period is close to the valley of a quasi-resonant signal.

20 Claims, 9 Drawing Sheets

QUASI-RESONANT CONTROLLED SWITCHING REGULATOR AND THE METHOD THEREOF

CROSS-REFERENCE TO RELATED APPLICATIONS

This application claims priority to and the benefit of Chinese patent application No. 201010270040.X, filed Aug. 27, 2010, which is incorporated herein by reference in its entirety.

TECHNICAL FIELD

The present disclosure relates generally to electrical circuits, and more particularly but not exclusively to switching regulators under quasi-resonant control.

BACKGROUND OF THE INVENTION

DC voltage sources are widely used as power supplies in many electronic devices. Generally, the DC voltage supplied by the DC voltage source is derived from an AC voltage. The AC voltage is rectified into an unregulated DC voltage by a rectifier firstly. Then the unregulated DC voltage is converted into a stable DC voltage as needed by the electronic devices.

Generally, a switching regulator comprises an energy storage component and a main switch which is usually electronically coupled to the energy storage component. The main switch is turned ON and OFF to alternately store energy in the energy storage component and transfer the stored energy to a load. The energy storage component may be realized by a transformer or an inductance.

There are two primary types of control methods used in the switching regulator. One is fixed frequency control and the other is variable frequency control. Although fixed frequency control is more widely applied, it suffers from high switching loss and efficiency variation with load or input voltage.

An example of variable frequency control is quasi-resonant (QR) control. FIG. 1 shows an example waveform of a switching regulator under QR control, where Vs represents the voltage across the main switch, CTRL represents a control signal controlling the ON and OFF of the main switch, and $I_t$ represents the current flowing through the energy storage component. In the example of FIG. 1, the switching regulator works under DCM (discontinuous current mode). When the current $I_t$ flowing through the energy storage component reduces to zero, the energy storage component resonates with the parasitic capacitance of the main switch. The main switch is turned ON when the voltage Vs across the main switch reaches its resonant valley, so as to reduce switching loss. The main switch is turned OFF when the current $I_t$ flowing through the energy storage component reaches a threshold level, which in the example of FIG. 1 may be a peak current limit signal.

Under QR control, the lighter the load, the shorter the ON time period and OFF time period of the main switch. If the output voltage is fixed, the light load and the high input voltage may result in high switching frequency and the consequent EMI (electromagnetic interference) problem. The EMI may not only reduce the quality of the power network, but also influence electrical devices connected to or placed near the switching regulator. Therefore, the switching frequency should be limited, for example, to be lower than 150 kHz.

The switching frequency may be limited by setting a time period limit, such as a minimum switching period, a minimum ON time period or a minimum OFF time period of the main switch. If a minimum OFF time period of the main switch is set, the main switch is only turned ON at the resonant valley after the minimum OFF time period. Thus the switching frequency is limited while the valley switching feature is preserved. However, this frequency limitation method may cause audible noise due to the frequency hopping.

FIG. 2 shows waveforms of signals in a conventional QR controlled switching regulator with frequency limitation, where Tmin represents the minimum OFF time period, and point A represents a resonant valley of the voltage Vs across the main switch. In real world applications, the position of the resonant valley A may vary due to disturbances in the circuit. When the resonant valley point A is slightly earlier, which means it occurs inside the minimum OFF time period Tmin, the main switch will be turned ON at the next resonant valley. When the resonant valley point A is slightly later, which means it occurs outside the minimum OFF time period $T_{limit}$, the main switch will be turned ON at the resonant valley point A. So the OFF time period of the main switch may vary due to the disturbances even when the load and the input voltage are stable. The variation of the OFF time period of the main switch will cause the switching frequency to hop in several switching periods, which may generate low frequency audible noise.

There are several methods of changing the minimum OFF time period $T_{limit}$ to avoid the switching frequency hopping. One method is to set two minimum OFF time periods. When one minimum OFF time period is close to the resonant valley, the system adopts the other minimum OFF time period to make sure there is enough distance between the minimum OFF time period and the resonant valley, so as to eliminate the risk of switching frequency hopping. The disadvantage of this method is that it is difficult to find two minimum OFF time periods suitable to a system under any conditions.

The present disclosure provides a quasi-resonant controlled switching regulator adopting a varying minimum OFF time period.

SUMMARY OF THE INVENTION

It is an object of the present disclosure to provide a primary side control switching mode power supply without auxiliary winding.

In accomplishing the above and other objects, there has been provided, in accordance with an embodiment of the present disclosure, a quasi-resonant controlled switching regulator, comprising: an energy storage component configured to receive an input signal and to supply an output signal to a load;

a main switch coupled to the energy storage component, wherein the energy storage component stores energy when the main switch is turned ON, and transfers the stored energy to the load when the main switch is turned OFF; a control circuit having a first input terminal, a second input terminal, a third input terminal, and an output terminal, wherein the first input terminal is configured to receive a sample signal indicative of a current flowing through the energy storage component, the second input terminal is configured to receive a feedback signal indicative of the output signal, the third input terminal is configured to receive an updated minimum OFF time signal, and wherein based on the sample signal, the feedback signal and the updated minimum OFF time signal, the control circuit generates a switching signal at the output terminal to control the main switch; and a frequency limitation circuit coupled to the control circuit to receive the switching signal, and wherein the frequency limitation circuit is configured to generate the updated minimum OFF time signal based on the switching signal to limit the frequency of the switching regulator.

Moreover, there has been provided, in accordance with an embodiment of the present disclosure, a switching regulator, comprising: an energy storage component configured to receive an input signal and supply an output signal to a load; a main switch coupled to the energy storage component, wherein the energy storage component stores energy when the main switch is turned ON, and transfer the stored energy to the load when the main switch is turned OFF; a control circuit configured to generate a switching signal to control the main switch in response to the sample signal, the feedback signal and the updated minimum OFF time period signal; a timer configured to record the minimum OFF time period of the current switching cycle of the regulator in response to the switching signal; a subtract circuit configured to generate a difference signal by subtract an offset value from the minimum OFF time period of the current switching cycle of the regulator; a comparison circuit configured to generate comparison signals by comparing the difference signal with a lower limit and an upper limit; and a setting circuit configured to generate the updated minimum OFF time period signal in response to the comparison signals, the difference signal, the lower limit, and the upper limit.

In addition, there has been provided, in accordance with an embodiment of the present disclosure, a method of controlling a switching regulator, the regulator comprising a main switch operating at ON/OFF state and an energy storage component coupled to the main switch, wherein the OFF time of the main switch in each cycle is limited by a minimum OFF time period, and the energy storage component storing energy when the main switch is ON, and transferring the stored energy to the load when the main switch is OFF, the method comprising: recording the OFF time period of the current switching cycle of the regulator; updating the minimum OFF time period for the next switching cycle of the regulator in response to the minimum OFF time period of the current switching cycle of the regulator; turning ON the main switch when a voltage across the main switch reaches a resonant valley after the minimum OFF time period ends; and turning OFF the main switch when a current flowing through the energy storage component reaches a peak current limit.

These and other features of the present disclosure will be readily apparent to persons of ordinary skill in the art upon reading the entirety of this disclosure, which includes the accompanying drawings and claims.

The use of the same reference label in different drawings indicates the same of like components.

DETAILED DESCRIPTION

In the present disclosure, numerous specific details are provided, such as examples of circuits, components, and methods, to provide a thorough understanding of embodiments of the disclosure. Persons of ordinary skill in the art will recognize, however, that the disclosure can be practiced without one or more of the specific details. In other instances, well-known details are not shown or described to avoid obscuring aspects of the disclosure.

Figure 1:
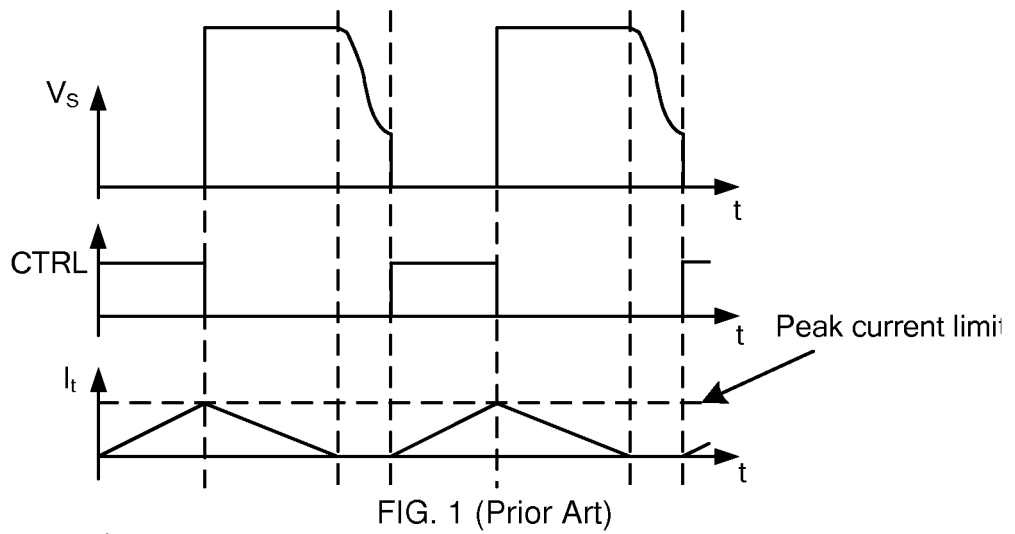
FIG. 1 shows waveforms of signals in a prior art switching regulator under quasi-resonant control.
Figure 2:
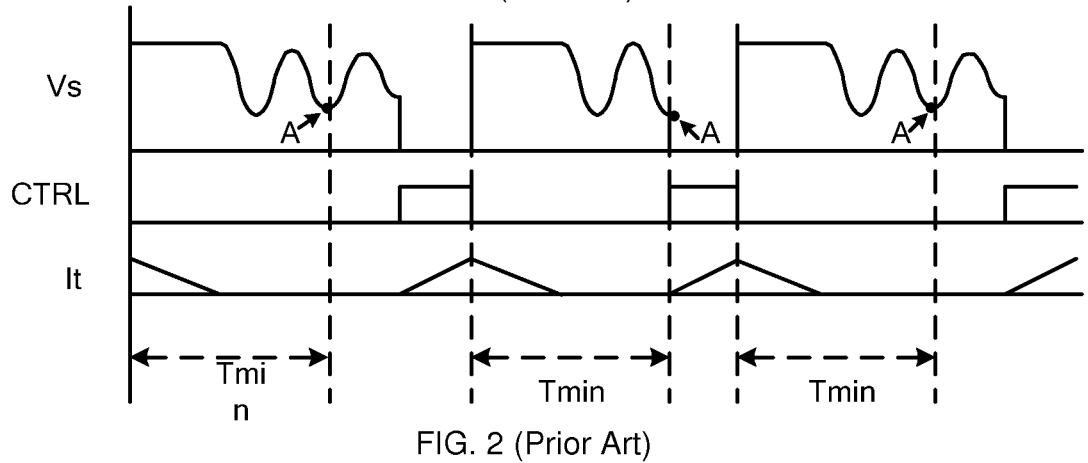
FIG. 2 shows a waveforms of signals in a prior art quasi-resonant controlled switching regulator with frequency limitation.
Figure 3:
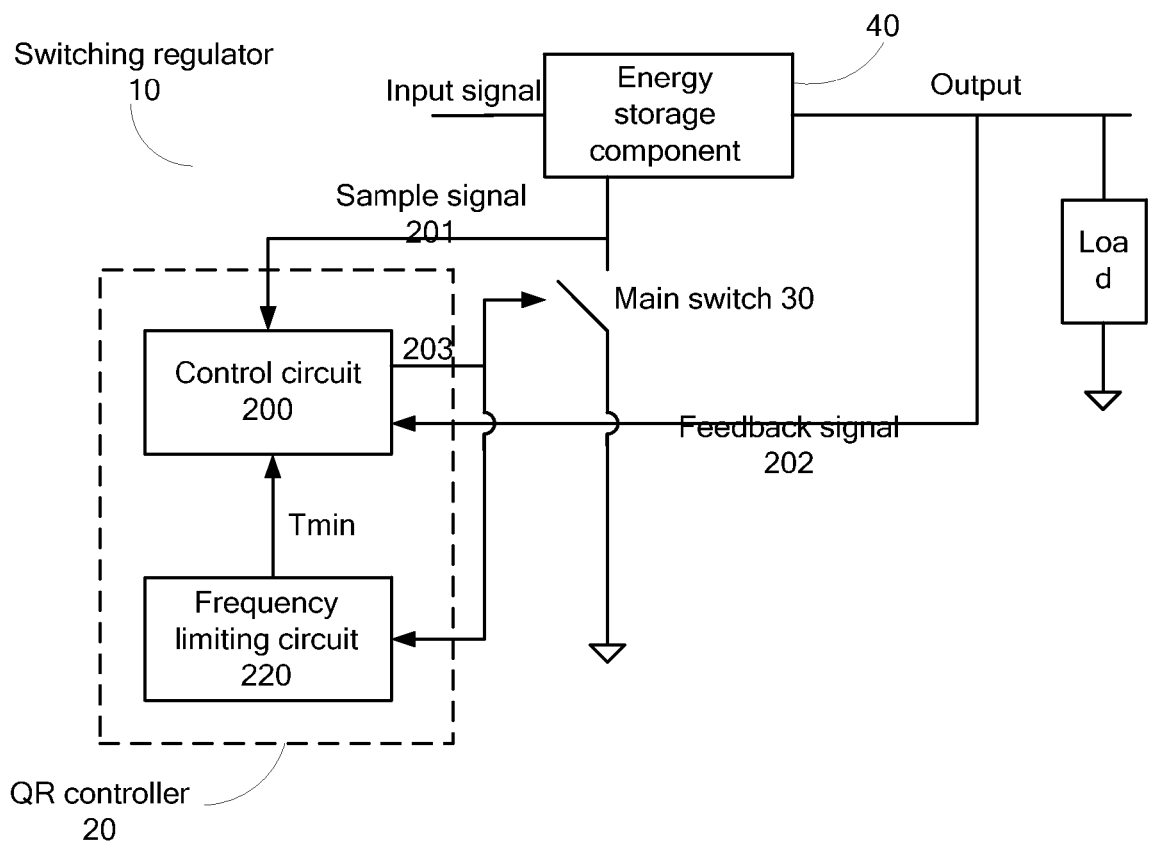
FIG. 3 shows a block diagram of a quasi-resonant controlled switching regulator 10 with frequency limitation in accordance with an embodiment of the present disclosure.

FIG. 3 shows a block diagram of a quasi-resonant controlled switching regulator 10 with frequency limitation in accordance with an embodiment of the present disclosure. The quasi-resonant controlled switching regulator 10 comprises: an energy storage component 40 configured to receive an input signal and to supply an output signal to a load; a main switch 30 coupled to the energy storage component 40, wherein the energy storage component 40 stores energy when the main switch 30 is turned ON, and transfers the stored energy to the load when the main switch 30 is turned OFF; a control circuit 200 having a first input terminal, a second input terminal, a third input terminal, and an output terminal, wherein the first input terminal is configured to receive a sample signal 201 indicative of a current flowing through the energy storage component, the second input terminal is configured to receive a feedback signal 202 indicative of the output signal, the third input terminal is configured to receive an updated minimum OFF time signal Tmin, and wherein based on the sample signal, the feedback signal and the updated minimum OFF time signal, the control circuit 200 generates a switching signal 203 at the output terminal to control the main switch 30; and a frequency limitation circuit 220 coupled to the control circuit 200 to receive the switching signal 203, and wherein the frequency limitation circuit is configured to generate the updated minimum OFF time signal Tmin based on the switching signal to limit the frequency of the switching regulator 10.

Persons of ordinary skill in the art should know that the main switch 30 may comprise metal oxide semiconductor field effect transistor (MOSFET) or isolated gate bipolar transistor (IGBT), etc.

The control circuit 200 and the frequency limitation circuit 220 constitute a quasi-resonant controller 20. In FIG. 3, a sample signal 201 indicative of the current flowing through the energy storage component 40, and a feedback signal 202 indicative of the output signal of the switching regulator 10, are input into the control circuit 200 to ensure the proper work of the switching regulator 10. The circuits which generate the sample signal 201 and feedback signal 202 known to persons of ordinary skill in the art, which are not shown in FIG. 3. The frequency limitation circuit 220 provides the minimum OFF time signal of the main switch 30 to the control circuit 200 to limit the switching frequency controlled by the control circuit 200.

In one embodiment, the quasi-resonant controlled switching regulator 10 works under boundary conduction mode. The main switch 30 is turned ON when the voltage across the main switch 30 reaches a resonant valley after the current flowing through the energy storage component 40 reduced to zero, so as to reduce the switching loss. The resonant is caused by the interaction of the parasitic capacitance of the main switch 30 and the energy storage component 40. The main switch 30 is turned OFF when the current flowing through the energy storage component reaches a peak current limit. The output voltage of the switching regulator 10 is regulated by the ON and OFF of the main switch 30. By limiting the minimum OFF time period of the main switch 30, the switching frequency of the switching regulator 10 is limited in a range.

In one embodiment, the main switch 30 is turned ON when the voltage across the main switch 30 reaches the resonant valley after the minimum OFF time period. The minimum OFF time period for the next switching cycle of the regulator is set according to the OFF time period of the current switching cycle of the regulator, so the minimum OFF time period is varied in each cycle, and there will be enough margin room between the minimum OFF time period and the resonant valley in each cycle. Thus, the frequency hopping accompanied with the low frequency audible noise may be avoided.

Figure 4:
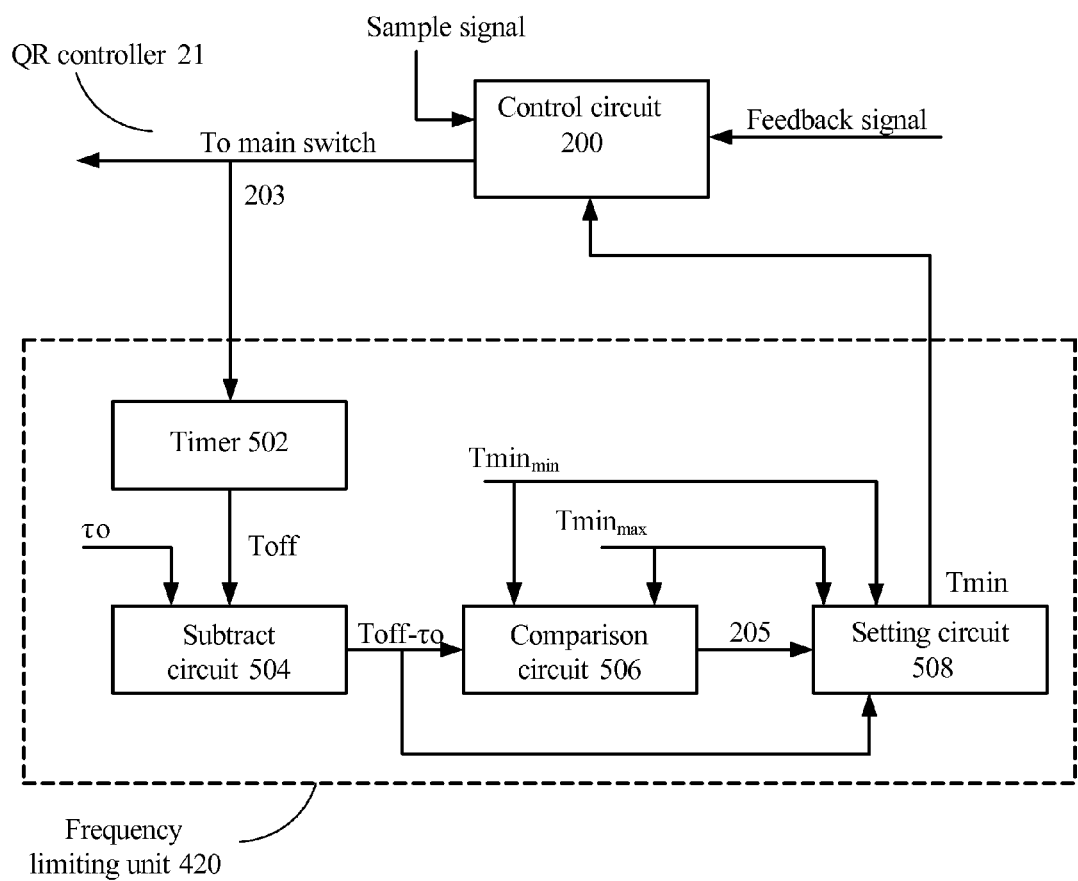
FIG. 4 shows a block diagram of a quasi-resonant controller 21 with frequency limitation in accordance with an embodiment of the present disclosure.

FIG. 4 shows a block diagram of a quasi-resonant controller 21 with frequency limitation in accordance with an embodiment of the present disclosure. The frequency limitation circuit comprises: a timer 502 having an input terminal and an output terminal, wherein the input terminal is configured to receive the switching signal 203, and based on the switching signal 203, the timer 502 starts counting when the main switch 30 is turned ON and stops counting when the main switch 30 is turned OFF, and generates a time signal Toff indicative of the OFF time period of the main switch 30 at the output terminal; a subtract circuit 504 having a first input terminal, a second input terminal and an output terminal, wherein the first input terminal is coupled to the timer 502 to receive the time signal Toff, the second input terminal is configured to receive an offset value $\tau o$, and wherein based on the time signal Toff and the offset value $\tau o$, the subtract circuit 504 provides a difference signal Toff–$\tau o$ indicative of the difference between the time signal Toff and the offset value $\tau o$ at the output terminal; a comparison circuit 506 having a first input terminal, a second input terminal, a third input terminal and an output terminal, wherein the first input terminal is coupled to the subtract circuit 504 to receive the difference signal Toff–$\tau o$, the second input terminal is configured to receive an upper limit $Tmin_{max}$ of the minimum OFF time period, the third input terminal is configured to receive a lower limit $Tmin_{min}$ of the minimum OFF time period, and wherein based on the difference signal Toff–$\tau o$, the upper limit $Tmin_{max}$ and the lower limit $Tmin_{min}$, the comparison circuit 506 generates a comparison signal 205 at the output terminal; and a setting circuit 508 having a first input terminal, a second input terminal, a third input terminal, a fourth input terminal and an output terminal, wherein the first input terminal is coupled to the comparison circuit 506 to receive the comparison signal 205, the second input terminal is coupled to the subtract circuit 504 to receive the difference signal Toff–$\tau o$, the third input terminal is configured to receive the upper limit $Tmin_{max}$ of the minimum OFF time period, the fourth input terminal is configured to receive the lower limit $Tmin_{min}$ of the minimum OFF time period, and wherein based on the comparison signal 205, the difference signal Toff–$\tau o$, the upper limit $Tmin_{max}$ and the lower limit $Tmin_{min}$ of the minimum OFF time period, the setting circuit 508 provides the updated minimum OFF time signal Tmin at the output terminal.

In one embodiment, the timer 502 works in response to the switching signal 203 which controls the ON and OFF of the main switch 30. In other embodiments, the timer 502 works in response to the signals indicative of the ON and OFF of the main switch 30.

The subtract circuit 504 receives the time signal Toff, and subtracts the offset value $\tau o$ from the time signal Toff, to get the difference Toff–$\tau o$. In one embodiment, the offset value $\tau o$ may be half of the resonant cycle caused by the energy storage component 40 and the parasitic capacitor of the main switch 30. In one embodiment, the subtract circuit 504 may be realized by a summer.

The comparison circuit 506 compares the difference Toff–$\tau o$ with the upper limit $Tmin_{max}$ and the lower limit $Tmin_{min}$ of the minimum OFF time period, to generate a comparison result. The comparison circuit 506 may comprise one or several comparators.

The operation of the setting circuit 508 which provides the updated minimum OFF time signal for the next switching cycle of the regulator to the control circuit 200 comprises: the setting circuit 508 sets the lower limit $Tmin_{min}$ of the minimum OFF time period as the minimum OFF time period for the next switching cycle of the regulator if the comparison result indicates that the difference Toff–$\tau o$ is smaller than the lower limit $Tmin_{min}$ of the minimum OFF time period; the setting circuit 508 sets the upper limit $Tmin_{max}$ of the minimum OFF time period as the minimum OFF time period for the next switching cycle of the regulator if the comparison result indicates that the difference Toff–$\tau o$ is larger than the upper limit $Tmin_{max}$ of the minimum OFF time period; and the setting circuit 508 sets the difference Toff–$\tau o$ as the minimum OFF time period for the next switching cycle of the regulator if the comparison result indicates that the difference Toff–$\tau o$ is between the upper limit $Tmin_{max}$ and the lower limit $Tmin_{min}$ of the minimum OFF time period.

The following equations show the function of the setting circuit 508:

$$Tmin = Toff - \tau o, \text{ if } Tmin_{min} < Toff - \tau o < Tmin_{max},$$

$$Tmin = Tmin_{min}, \text{ if } Toff - \tau o \leq Tmin_{min},$$

$$Tmin = Tmin_{min}, \text{ if } Toff - \tau o \geq Tmin_{max}.$$

Figure 5:
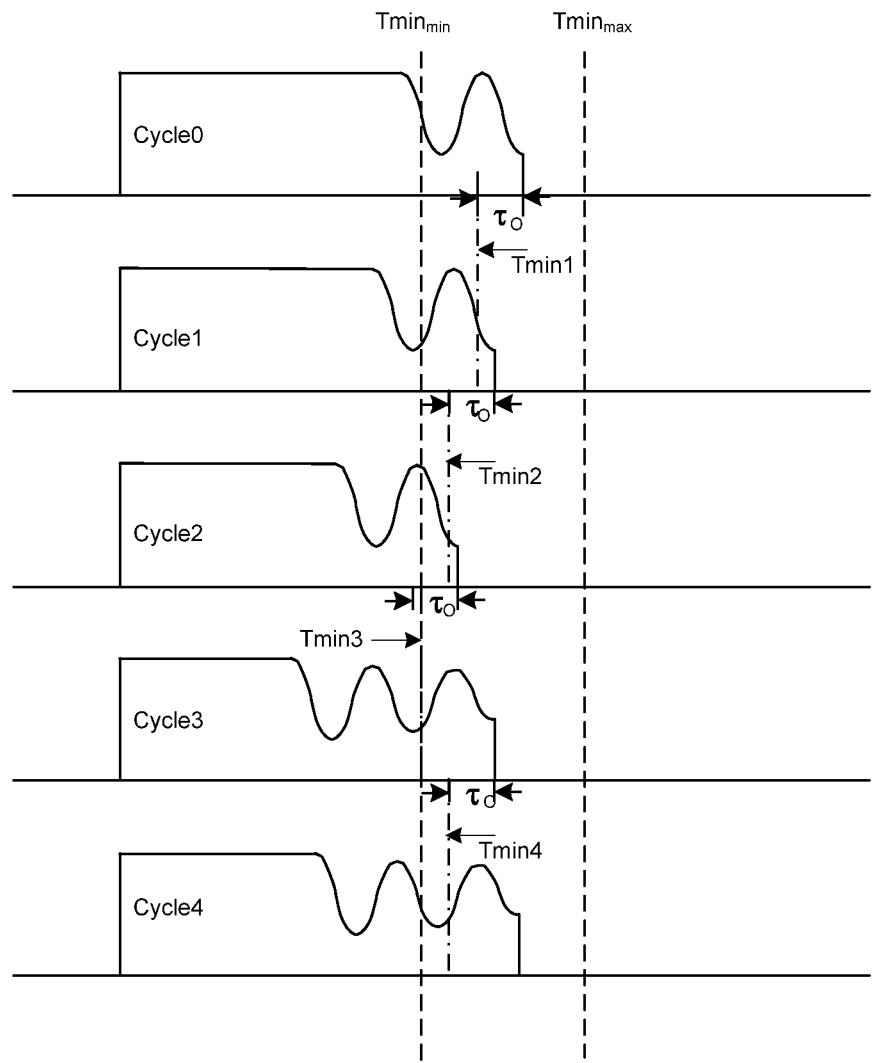
FIG. 5 shows the example waveforms of the quasi-resonant controller in FIG. 4.

FIG. 5 shows the example waveforms of the signals in the quasi-resonant controller 20 in FIG. 4. Assuming the load of the switching regulator 10 decreases slowly, in order to clearly describe the function of the quasi-resonant controller 20. As described hereinbefore, the peak current limit decreases when the load decreases, so does the switching cycle time period. FIG. 5 shows the voltage across the main switch 30 of five continuous cycles which has a decreasing load. In every cycle, the timer 502 records the OFF time period Toff of the current switching cycle of the regulator, then the subtractor subtracts the offset value $\tau o$ from the OFF time period Toff to get the difference Toff–$\tau o$. The comparison circuit compares the difference Toff–$\tau o$ with the two limits of the minimum OFF time period to judge if the difference Toff–$\tau o$ is in the range determined by the two limits of the minimum OFF time period. The waveforms in FIG. 5 overstate the differences of the arriving time of the resonant cycle caused by the decreasing load among every cycle. As the load decreases, the main switch should be turned ON at the later resonant valley in the next switching cycle of the regulator than the main switch be turned ON in the current switching cycle of the regulator. For example, in cycle0, the OFF time ends at the second resonant valley and is recorded by the timer 502, and the frequency limitation circuit 220 generates the difference Tmin1=Toff0–τo, wherein Toff0 represents the OFF time period of cycle0. From FIG. 5, we can see that the difference Tmin1 is between the two limits of the minimum OFF time period, so the difference Tmin1 is set to be the minimum OFF time period of cycle1. In cycle1, because the minimum OFF time period Tmin1 ends before the second resonant valley of the voltage across the main switch, the main switch is turned ON at the second resonant valley. Then the OFF time period Toff1 is recorded, and the difference Tmin2=Toff1–τo is set to be the minimum OFF time period for cycle2. The main switch is turned ON at the second resonant valley in cycle2. As be seen from FIG. 5, in cycle3, the difference Tmin3 is smaller than the lower limit $Tmin_{min}$ of the minimum OFF time period, so the lower limit $Tmin_{min}$ of the minimum OFF time period is set to be the minimum OFF time period for cycle3. Now because the minimum OFF time period of cycle3 is larger than it should be, the average current is decreased too much in cycle3. The peak current limit in cycle4 needs to be increased to compensate the current lost in cycle3. This leads to the resonant cycle coming later in cycle4. The minimum OFF time period Tmin4 set for cycle4 is between the two limits of the minimum OFF time period, and is after the second resonant valley in cycle4, so the main switch is turned ON at the third resonant valley in cycle4.

Assuming the minimum OFF time period in the system is fixed, i.e., the minimum OFF time period in cycle4 is the same with the minimum OFF time period in cycle3, then the main switch will be turned ON at the second resonant valley in cycle4, which is not expected to happen. The main switch being turned ON at an earlier resonant valley in the next switching cycle of the regulator will cause the frequency hopping when the load decreases and finally lead to the low frequency audible noise. The embodiment described before eliminates this defect. By setting a suitable peak current limit, the frequency hopping could be avoided.

Figure 6:
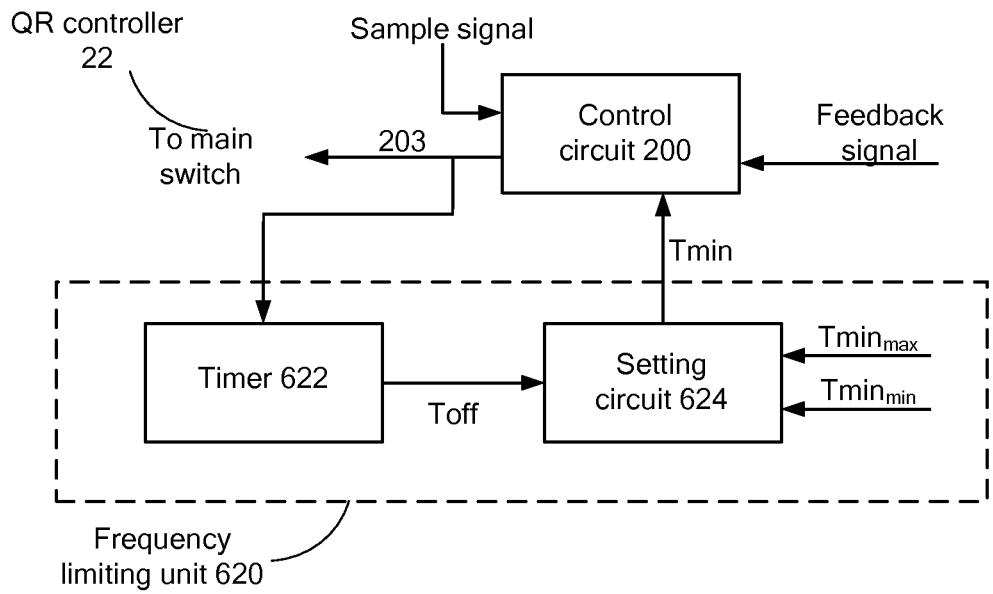
FIG. 6 shows a block diagram of a quasi-resonant controller 22 with frequency limitation in accordance with an embodiment of the present disclosure.

FIG. 6 shows a block diagram of a quasi-resonant controller 22 with frequency limitation in accordance with an embodiment of the present disclosure. The frequency limitation circuit 620 in FIG. 6 comprises: a timer 622 having an input terminal and an output terminal, wherein the input terminal is coupled to the control circuit 200 to receive the switching signal 203, and based on the switching signal 203, the timer 622 starts counting when the main switch is turned ON and stops counting when the main switch is turned OFF, and generates a time signal Toff indicative of the OFF time period of the main switch at the output terminal; and a setting circuit 624 having a first input terminal, a second input terminal, a third input terminal and an output terminal, wherein the first input terminal is coupled to the timer 622 to receive the time signal Toff, the second input terminal is configured to receive the upper limit $Tmin_{max}$ of the minimum OFF time period, the third input terminal is configured to receive the lower limit $Tmin_{min}$ of the minimum OFF time period, and wherein based on the time signal Toff, the upper limit $Tmin_{max}$ and the lower limit $Tmin_{min}$ of the minimum OFF time period, the setting circuit provides the updated minimum OFF time signal Tmin for the next switching cycle of the regulator at the output terminal.

Figure 7:
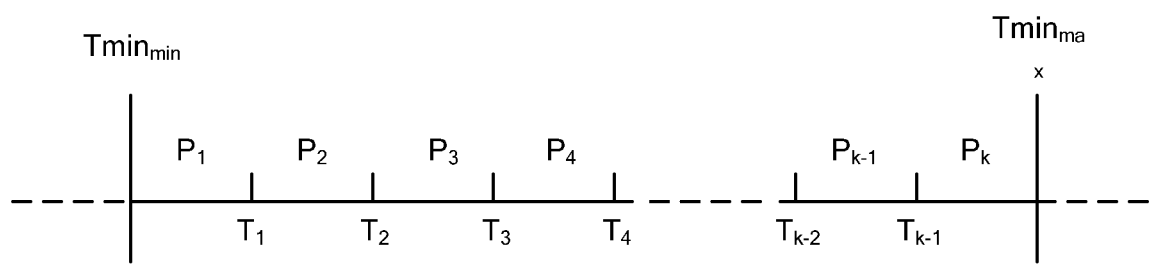
FIG. 7 shows the subintervals between a lower limit $Tmin_{min}$ and an upper limit $Tmin_{max}$ of a minimum OFF time period.

The time period between the upper limit $Tmin_{max}$ and the lower limit $Tmin_{min}$ of the minimum OFF time period is divided into a plurality of subintervals, wherein these subintervals are mapped to different values of the minimum OFF time period. FIG. 7 shows the subintervals between the lower limit $Tmin_{min}$ and the upper limit $Tmin_{max}$ of the minimum OFF time period. In FIG. 7, $P_1, P_2, \ldots P_k$ is the subintervals between the lower limit $Tmin_{min}$ and the upper limit $Tmin_{max}$ of the minimum OFF time period. And $T_1, T_2, \ldots T_{k-1}$ are the mapped minimum OFF time periods set for the next switching cycle of the regulator.

In one embodiment, either the first two or the first three subintervals are mapped to the lower limit of the minimum OFF time period, and the relation ship between the OFF time period of the current switching cycle of the regulator and the minimum OFF time period set for the next switching cycle of the regulator is showed in table 1. As is seen from table 1, when the OFF time period of the current switching cycle of the regulator is in the subintervals $P_1$, $P_2$ and $P_3$, the minimum OFF time period set for the next switching cycle of the regulator is the lower limit $Tmin_{min}$ of the minimum OFF time period. When the OFF time period of the current switching cycle of the regulator is in the subinterval $P_4$, the minimum OFF time period set for the next switching cycle of the regulator is $T_1$. When the OFF time period of the current switching cycle of the regulator is in the subinterval $P_k$, the minimum OFF time period set for the next switching cycle of the regulator is $T_{k-3}$. When the OFF time period of the current switching cycle of the regulator is larger than $Tmin_{max}$, the minimum OFF time period set for the next switching cycle of the regulator is $T_{k-2}$. Referring to FIG. 7, the difference between the OFF time period of the current switching cycle of the regulator and the minimum OFF time period set for the next switching cycle of the regulator is 2~3 subintervals.

TABLE 1

| Toff | Tmin |
|---|---|
| $P_1, P_2, P_3$ | $Tmin_{min}$ |
| $P_4$ | $T_1$ |
| $P_5$ | $T_2$ |
| ... | ... |
| $P_{k-1}$ | $T_{k-4}$ |
| $P_k$ | $T_{k-3}$ |
| $\geq Tmin_{max}$ | $T_{k-2}$ |

In one embodiment, the difference between the OFF time period of the current switching cycle of the regulator and the minimum OFF time period set for the next switching cycle of the regulator is 1~2 subintervals, and their relation ship is shown in table 2. Persons of ordinary skill in the art should know that the difference between the OFF time period of the current switching cycle of the regulator and the minimum OFF time period set for the next switching cycle of the regulator may be other values if another relation ship table is taken into use.

TABLE 2

| Toff | Tmin |
|---|---|
| $P_1, P_2$ | $Tmin_{min}$ |
| $P_3$ | $T_1$ |
| $P_4$ | $T_2$ |
| ... | ... |
| $P_{k-1}$ | $T_{k-3}$ |
| $P_k$ | $T_{k-2}$ |
| $\geq Tmin_{max}$ | $T_{k-1}$ |

The relation ship table may be stored in the setting circuit, or may be stored in some external memories. The frequency limitation circuit searches the table before setting the minimum OFF time period for the next switching cycle of the regulator.

Figure 8:
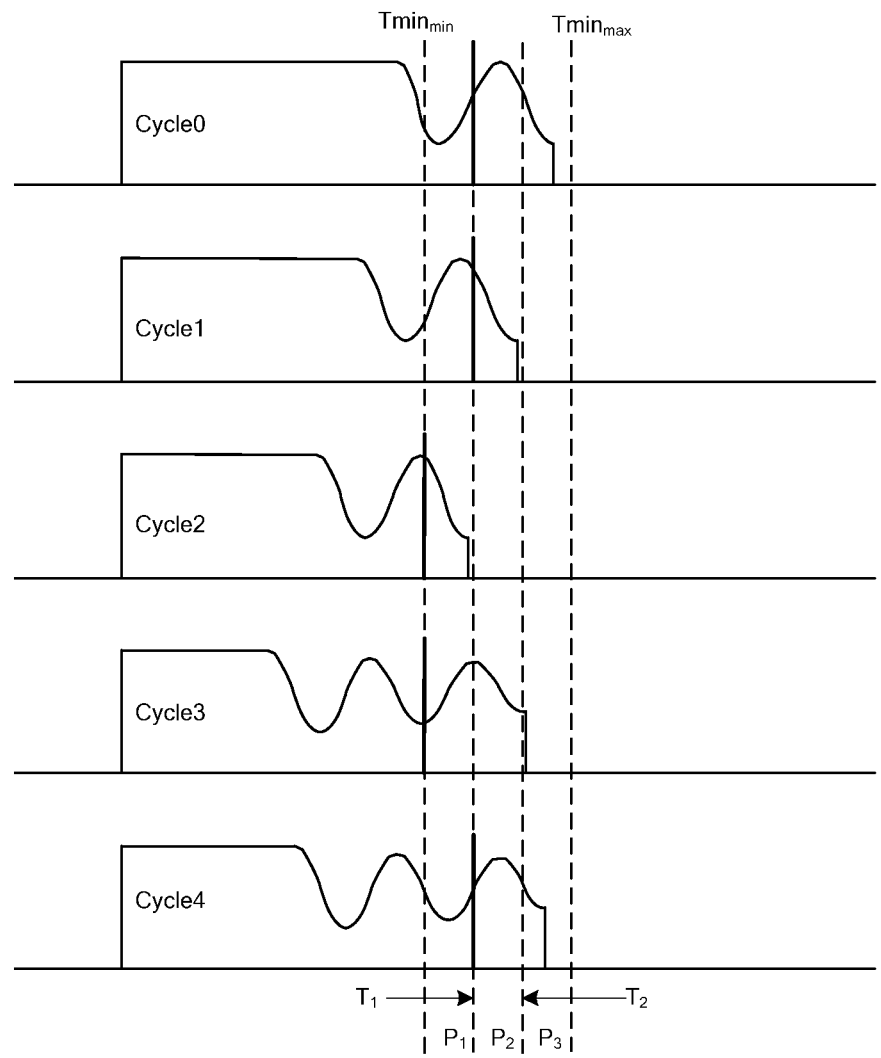
FIG. 8 shows the example waveforms of the signals in the quasi-resonant controlled switching regulator in FIG. 6.

FIG. 8 shows the example waveforms of the signals in the quasi-resonant controller 22 in FIG. 6. The frequency limitation circuit 620 in FIG. 6 is described with referring to FIG. 8 and table 3. Assuming the load of the switching regulator 10 decreases slowly in order to clearly describe the function of the quasi-resonant controller 22. Referring to table 3, there are three subintervals $P_1$, $P_2$ and $P_3$ between the two limits of the minimum OFF time period. In cycle0, the timer 622 records the OFF time period Toff0. The setting circuit 624 figures out that Toff0 is in the subinterval $P_3$. According to table 3, the mapped minimum OFF time period is $T_1$, so $T_1$ is set as the updated minimum OFF time period for cycle1 and is provided to the control circuit 200. In cycle1, the OFF time period is in the subinterval $P_2$, so $Tmin_{min}$ is set as the updated minimum OFF time period for cycle2 and is provided to the control circuit 200. In cycle2, the OFF time period is in the subinterval $P_1$, so $Tmin_{min}$ is set as the updated minimum OFF time period for cycle3. Now because the minimum OFF time period of cycle3 is larger than it should be, the average current is decreased too much. The peak current limit in cycle4 needs to be increased to compensate the current lost in cycle3. This leads to the resonant cycle coming later in cycle4. In cycle3, the OFF time period is in the subinterval $P_3$, $T_1$ is set as the minimum OFF time period for cycle4. As is seen from FIG. 8, the minimum OFF time period in cycle4 is larger than the minimum OFF time period in cycle3, the main switch of the switching regulator will be turned ON at the third resonant valley, and the frequency hopping is avoided.

TABLE 3

| Toff | Tmin |
|---|---|
| $P_1$, $P_2$ | $Tmin_{min}$ |
| $P_3$ | $T_1$ |
| $\geq Tmin_{max}$ | $T_2$ |

Figure 9:
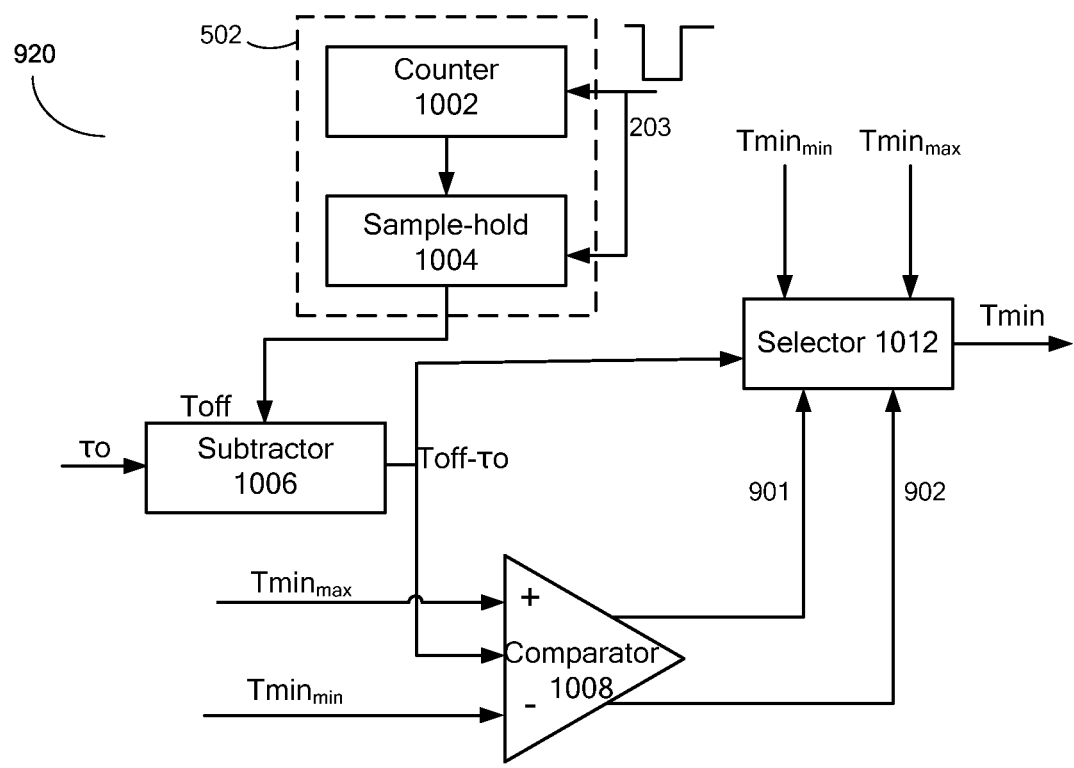
FIG. 9 schematically shows a frequency limitation circuit 920 in accordance with an embodiment of the present disclosure.

FIG. 9 schematically shows a frequency limitation circuit 920 in accordance with an embodiment of the present disclosure. In FIG. 9, the frequency limitation circuit 920 comprises: a timer 502 having an input terminal and an output terminal, wherein the input terminal is configured to receive the switching signal 203, and based on the switching signal 203, the timer 502 starts counting when the main switch 30 is turned ON and stops counting when the main switch 30 is turned OFF, and generates a time signal Toff indicative of an OFF time period of the main switch at the output terminal; a subtractor 1006 having a first input terminal, a second input terminal and an output terminal, wherein the first input terminal is coupled to the timer 502 to receive the time signal Toff, the second input terminal is configured to receive an offset value τo, and wherein based on the time signal Toff and the offset value τo, the subtractor 1006 provides a difference signal Toff–τo indicative of the difference between the time signal Toff and the offset value τo at the output terminal; a comparator 1008 having a first input terminal, a second input terminal, a third input terminal, a first output terminal and a second output terminal, wherein the first input terminal is configured to receive the difference signal Toff–τo, the second input terminal is configured to receive a lower limit $Tmin_{min}$ of a minimum OFF time period, the third input terminal is configured to receive an upper limit $Tmin_{max}$ of the minimum OFF time period, and wherein based on the difference signal Toff–τo, the lower limit $Tmin_{min}$ and the upper limit $Tmin_{max}$, the comparator 1008 provides a first comparison signal 901 at the first output terminal and provides a second comparison signal 902 at the second output terminal; and a selector having a first input terminal, a second input terminal, a third input terminal, a first control terminal, a second control signal and an output terminal, wherein the first input terminal is coupled to the output of the subtracting circuit to receive the difference signal Toff–τo, the second input terminal is configured to receive the lower limit $Tmin_{min}$ of the minimum OFF time period, the third input terminal is configured to receive the upper limit $Tmin_{max}$ of the minimum OFF time period, the first control terminal is coupled to the comparator 1008 to receive the first comparison signal 901, the second control terminal is coupled to the comparator 1008 to receive the second comparison signal 902, and wherein based on the difference signal Toff–τo, the lower limit $Tmin_{min}$, the upper limit $Tmin_{max}$, the first comparison signal 901 and the second comparison signal 902, the selector 1012 provides the updated minimum OFF time signal at the output terminal.

In one embodiment, the timer 502 comprises a counter 1002 having an input terminal and an output terminal, wherein the input terminal is configured to receive the switching signal 203, and wherein based on the switching signal 203, the counter starts counting when the main switch is turned OFF, and stops counting when the main switch is turned ON, and provides an counting signal at the output terminal; and a sample-hold circuit 1004 having a first input terminal, a second input terminal and an output terminal, wherein the first input terminal is configured to receive the switching signal 203, the second input terminal is configured to receive the counting signal, and wherein based on the counting signal and the switching signal 203, the sample-hold circuit 1004 provides the time signal indicative of the ON time of the main switch at the output terminal. The sample-hold circuit 1004 records the OFF time period of the main switch and generates the time signal Toff.

In one embodiment, when the first comparator 1008 generates a logical high signal, the second comparator 1010 generates a logical low signal, which means the difference signal Toff–τo is between the lower limit $Tmin_{min}$ and the upper limit $Tmin_{max}$ of the minimum OFF time period, the difference signal Toff–τo is selected by the first selector 1012, and is set to be the updated minimum OFF time signal for the next switching cycle of the regulator. When the first comparator 1008 generates a logical low signal, the second comparator 1010 generates a logical low signal, which means the difference signal Toff–τo is lower than the lower limit $Tmin_{min}$ of the minimum OFF time period, the lower limit $Tmin_{min}$ of the minimum OFF time period is selected by the first selector 1012, and is set to be the updated minimum OFF time signal for the next switching cycle of the regulator. When the first comparator 1008 generates a logical high signal, the second comparator 1010 generates a logical high signal, which means the difference signal Toff–τo is larger than the upper limit $Tmin_{max}$ of the minimum OFF time period, the upper limit $Tmin_{max}$ of the minimum OFF time period is selected by the first selector 1012, and is set to be the updated minimum OFF time signal for the next switching cycle of the regulator.

Figure 10:
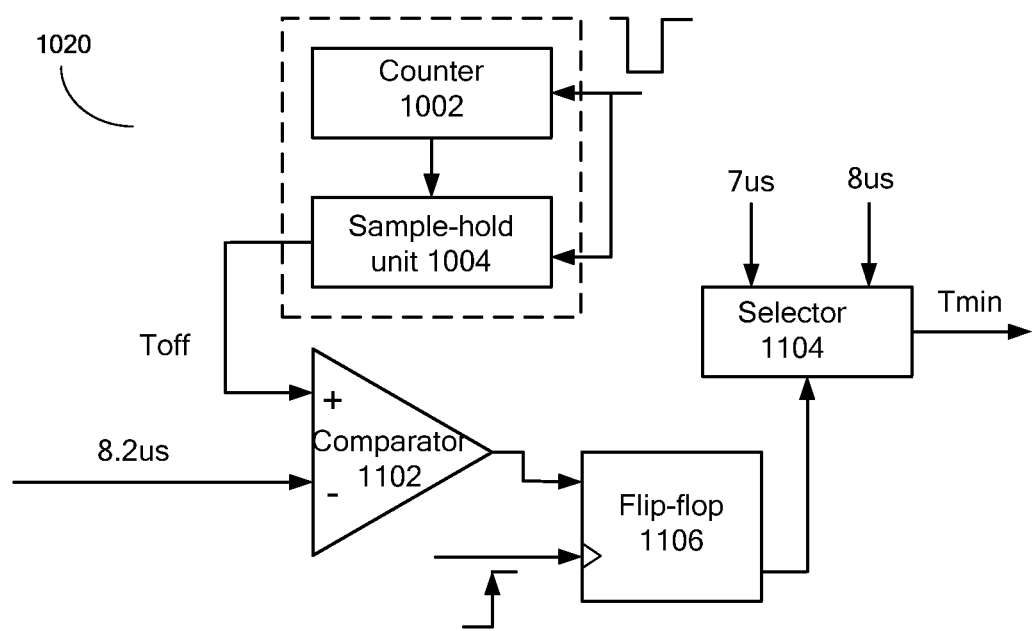
FIG. 10 shows the detailed circuit 1020 of the frequency limitation circuit 620 in accordance with an embodiment of the present disclosure.
Figure 11:
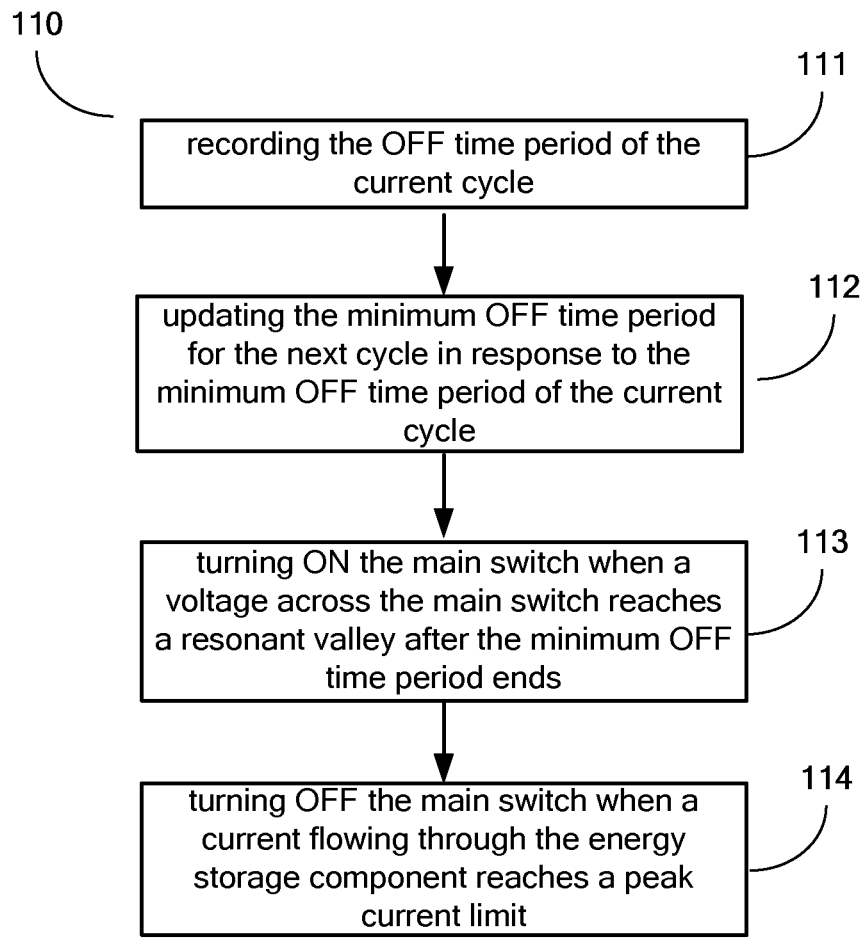
FIG. 11 shows a flow diagram 110 of a method of operating a quasi-resonant switching regulator in accordance with an embodiment of the present disclosure.

FIG. 10 is the detailed circuit of the frequency limitation circuit 620 in accordance with an embodiment of the present disclosure. The components which are similar to those in FIG. 9 are not described here for brevity. In one embodiment, a table 4 is applied as the relationship between the OFF time period of the current switching cycle of the regulator and the minimum OFF time period of the next switching cycle of the regulator. In the example of FIG. 10, the setting circuit 624 comprises a third comparator 1102, a second selector 1104 and the flip-flop 1106 coupled as shown. The comparator 1102 receives a reference time 8.2 µS and the time signal Toff which is provided by the sample-hold circuit 1004. The flip-flop 1106 receives the comparison result generated by the comparator 1102. When the main switch is turned ON, the flip-flop 1106 transmits the comparison result to the second selector 1104 to control the output of the selector 1104. The input terminals of the selector 1104 receive candidate minimum OFF time periods 7 µS and 8 µS. The second selector 1104 may select one of the candidate minimum OFF time period as the updated minimum OFF time signal for the next switching cycle of the regulator according to the comparison result at the control terminal. For example, when the time signal Toff is 8.5 µS, which means it is in the subinterval of larger than 8.2 µS, the comparator 1102 generates a logical high signal. Accordingly, the flip-flop 1106 transmits the logical high signal to the control terminal of the second selector 1104 once the main switch is turned ON. Then the second selector 1104 selects 8 µS to be the updated minimum OFF time signal. When time signal Toff is 8 µS, which means it is in the subinterval of less than 8.2 µS, the comparator 1102 generates a logical low signal. The flip-flop 1106 transmits the logical low signal to the control terminal of the second selector 1104. So 7 µS is selected as the updated minimum OFF time signal for the next switching cycle of the regulator.

TABLE 4

| $T_{off}$ | $T_{min}$ |
|---|---|
| ≥8.2 µS | 8 µS |
| <8.2 µS | 7 µS |

Persons of ordinary skill in the art should know that, there may be more than two candidate minimum OFF time periods.

Furthermore, the present disclosure discloses a method of controlling a switching regulator, the regulator comprising a main switch operating at ON/OFF state and an energy storage component coupled to the main switch, wherein the OFF time of the main switch in each cycle is limited by a minimum OFF time period, and the energy storage component storing energy when the main switch is ON, and transferring the stored energy to the load when the main switch is OFF, the method comprising: step 111, recording the OFF time period of the current switching cycle of the regulator; step 112, updating the minimum OFF time period for the next switching cycle of the regulator in response to the minimum OFF time period of the current switching cycle of the regulator; step 113, turning ON the main switch when a voltage across the main switch reaches a resonant valley after the minimum OFF time period ends; and step 114, turning OFF the main switch when a current flowing through the energy storage component reaches a peak current limit.

In one embodiment, the step 112 comprises limiting the minimum OFF time period by an upper limit and a lower limit.

In one embodiment, the step 112 further comprises: recording the OFF time period of the current switching cycle of the regulator; subtracting an offset value from the OFF time period of the current switching cycle of the regulator to get a difference signal; comparing the difference signal to the upper limit and the lower limit of the minimum OFF time period to get a comparison signal; and updating the minimum OFF time period for the next switching cycle of the regulator according to the comparison signal.

In one embodiment, updating the minimum OFF time period for the next switching cycle of the regulator according to the comparison signal comprises: setting the lower limit of the minimum OFF time period as the updated minimum OFF time signal for the next switching cycle of the regulator if the comparison signal indicates that the difference signal is smaller than the lower limit of the minimum OFF time period; setting the upper limit of the minimum OFF time period as the updated minimum OFF time signal for the next switching cycle of the regulator if the comparison signal indicates that the difference signal is larger than the upper limit of the minimum OFF time period; and setting the difference signal as the updated minimum OFF time period for the next switching cycle of the regulator if the comparison signal indicates that the difference signal is between the upper limit and the lower limit of the minimum OFF time period.

In one embodiment, updating the minimum OFF time period for the next switching cycle of the regulator in response to the OFF time period of the current switching cycle of the regulator further comprises: recording the OFF time period of the current switching cycle of the regulator; dividing the time between the upper limit and the lower limit of the minimum OFF time period to a plurality of subintervals; respectively mapping every subinterval to different minimum OFF time period; and setting the mapped minimum OFF time period of the subinterval for the next switching cycle of the regulator when the OFF time period of the current switching cycle of the regulator is in this subinterval.

An effective technique for limiting the frequency in a quasi-controlled switching regulator has been disclosed. While specific embodiments of the present disclosure have been provided, it is to be understood that these embodiments are for illustration purposes and not limiting. Many additional embodiments will be apparent to persons of ordinary skill in the art reading this disclosure.

What is claimed is:

1. A quasi-resonant controlled switching regulator comprising:
    an energy storage component configured to receive an input signal and to supply an output signal to a load;
    a main switch coupled to the energy storage component, wherein the energy storage component stores energy when the main switch is turned ON, and transfers the stored energy to the load when the main switch is turned OFF;
    a control circuit having a first input terminal, a second input terminal, a third input terminal, and an output terminal, wherein the first input terminal is configured to receive a sample signal indicative of a current flowing through the energy storage component, the second input terminal is configured to receive a feedback signal indicative of the output signal, the third input terminal is configured to receive an updated minimum OFF time signal, and wherein based on the sample signal, the feedback signal and the updated minimum OFF time signal, the control circuit generates a switching signal at the output terminal to control the main switch; and
    a frequency limitation circuit coupled to the control circuit to receive the switching signal, and wherein the frequency limitation circuit is configured to generate the updated minimum OFF time signal based on the difference between an OFF time period of the main switch and an offset value to limit the frequency of the switching regulator.

2. The switching regulator of claim 1, wherein the frequency limitation circuit comprises:

a timer having an input terminal and an output terminal, wherein the input terminal is configured to receive the switching signal, and based on the switching signal, the timer starts counting when the main switch is turned ON and stops counting when the main switch is turned OFF, and generates a time signal indicative of the OFF time period of the main switch at the output terminal;

a subtract circuit having a first input terminal, a second input terminal and an output terminal, wherein the first input terminal is coupled to the timer to receive the time signal, the second input terminal is configured to receive the offset value, and wherein based on the time signal and the offset value, the subtract circuit provides a difference signal indicative of the difference between the time signal and the offset value at the output terminal;

a comparison circuit having a first input terminal, a second input terminal, a third input terminal and an output terminal, wherein the first input terminal is coupled to the subtract circuit to receive the difference signal, the second input terminal is configured to receive an upper limit of the minimum OFF time period, the third input terminal is configured to receive a lower limit of the minimum OFF time period, and wherein based on the difference signal, the upper limit and the lower limit, the comparison circuit generates a comparison signal at the output terminal; and a setting circuit having a first input terminal, a second input terminal, a third input terminal, a fourth input terminal and an output terminal, wherein the first input terminal is coupled to the comparison circuit to receive the comparison signal, the second input terminal is coupled to the subtract circuit to receive the difference signal, the third input terminal is configured to receive the upper limit of the minimum OFF time period, the fourth input terminal is configured to receive the lower limit of the minimum OFF time period, and wherein based on the comparison signal, the difference signal, the upper limit and the lower limit of the minimum OFF time period, the setting circuit provides the updated minimum OFF time signal at the output terminal.

3. The switching regulator of claim 2, wherein:

the setting circuit sets the lower limit of the minimum OFF time period as the updated minimum OFF time signal for the next switching cycle of the regulator if the comparison signal indicates that the difference signal is smaller than the lower limit of the minimum OFF time period;

the setting circuit sets the upper limit of the minimum OFF time period as the updated minimum OFF time signal for the next switching cycle of the regulator if the comparison signal indicates that the difference signal is larger than the upper limit of the minimum OFF time period; and the setting circuit sets the difference signal as the updated minimum OFF time signal for the next switching cycle of the regulator if the comparison signal indicates that the difference signal is between the upper limit and the lower limit of the minimum OFF time period.

4. The switching regulator of claim 2, wherein the timer comprises:

a counter having an input terminal and an output terminal, wherein the input terminal is configured to receive the switching signal, and wherein based on the switching signal, the counter starts counting when the main switch is turned OFF, and stops counting when the main switch is turned ON, and provides an counting signal at the output terminal; and a sample-hold circuit having a first input terminal, a second input terminal and an output terminal, wherein the first input terminal is configured to receive the switching signal, the second input terminal is configured to receive the counting signal, and wherein based on the counting signal and the switching signal, the sample-hold circuit provides the time signal indicative of the ON time of the main switch at the output terminal.

5. A quasi-resonant controlled switching regulator comprising:

an energy storage component configured to receive an input signal and to supply an output signal to a load;

a main switch coupled to the energy storage component, wherein the energy storage component stores energy when the main switch is turned ON, and transfers the stored energy to the load when the main switch is turned OFF;

a control circuit having a first input terminal, a second input terminal, a third input terminal, and an output terminal, wherein the first input terminal is configured to receive a sample signal indicative of a current flowing through the energy storage component, the second input terminal is configured to receive a feedback signal indicative of the output signal, the third input terminal is configured to receive an updated minimum OFF time signal, and wherein based on the sample signal, the feedback signal and the updated minimum OFF time signal, the control circuit generates a switching signal at the output terminal to control the main switch; and a frequency limitation circuit coupled to the control circuit to receive the switching signal, and wherein the frequency limitation circuit is configured to generate the updated minimum OFF time signal based on the switching signal to limit the frequency of the switching regulator, wherein the frequency limitation circuit comprises:

a timer having an input terminal and an output terminal, wherein the input terminal is coupled to the control circuit to receive the switching signal, and based on the switching signal, the timer starts counting when the main switch is turned ON and stops counting when the main switch is turned OFF, and generates a time signal indicative of the OFF time period of the main switch at the output terminal; and a setting circuit having a first input terminal, a second input terminal, a third input terminal and an output terminal, wherein the first input terminal is coupled to the timer to receive the time signal, the second input terminal is configured to receive an upper limit of a minimum OFF time period, the third input terminal is configured to receive a lower limit of the minimum OFF time period, and wherein based on the time signal, the upper limit and the lower limit of the minimum OFF time period, the setting circuit provides the updated minimum OFF time signal for the next switching cycle of the regulator at the output terminal.

6. The switching regulator of claim 5, wherein the setting circuit divides the time between the upper limit and the lower limit of the minimum OFF time period into a plurality of subintervals, and wherein the subintervals are mapped to different values of the updated minimum OFF time signal.

7. The switching regulator of claim 6, wherein either the first two subintervals or the first three subintervals are mapped to the lower limit of the minimum OFF time period.

8. The switching regulator of claim 6, wherein the setting circuit sets the mapped minimum OFF time period of each of the plurality of subintervals as the minimum OFF time period for the next switching cycle of the regulator when the OFF time period of the main switch of the current switching cycle of the regulator is in the respective subinterval.

9. The switching regulator of claim 1, wherein the frequency limitation circuit comprises:
a timer having an input terminal and an output terminal, wherein the input terminal is configured to receive the switching signal, and based on the switching signal, the timer starts counting when the main switch is turned ON and stops counting when the main switch is turned OFF, and generates a time signal indicative of act the OFF time period of the main switch at the output terminal;
a subtractor having a first input terminal, a second input terminal and an output terminal, wherein the first input terminal is coupled to the timer to receive the time signal, the second input terminal is configured to receive the offset value, and wherein based on the time signal and the offset value, the subtract circuit provides a difference signal indicative of the difference between the time signal and the offset value at the output terminal;
a comparator having a first input terminal, a second input terminal, a third input terminal, a first output terminal and a second output terminal, wherein the first input terminal is configured to receive the difference signal, the second input terminal is configured to receive a lower limit of a minimum OFF time period, the third input terminal is configured to receive an upper limit of the minimum OFF time period, and wherein based on the difference signal, the lower limit and the upper limit, the comparator provides a first comparison signal at the first output terminal and provides a second comparison signal at the second output terminal; and
a selector having a first input terminal, a second input terminal, a third input terminal, a first control terminal, a second control signal and an output terminal, wherein the first input terminal is coupled to the output of the subtracting circuit to receive the difference signal, the second input terminal is configured to receive the lower limit of the minimum OFF time period, the third input terminal is configured to receive the upper limit of the minimum OFF time period, the first control terminal is coupled to the comparator to receive the first comparison signal, the second control terminal is coupled to the comparator to receive the second comparison signal, and wherein based on the difference signal, the lower limit, the upper limit, the first comparison signal and the second comparison signal, the selector provides the updated minimum OFF time signal at the output terminal.

10. The switching regulator of claim 9, wherein the timer comprises:
a counter having an input terminal and an output terminal, wherein the input terminal is configured to receive the switching signal, and wherein based on the switching signal, the counter starts counting when the main switch is turned OFF, and stops counting when the main switch is turned ON, and provides an counting signal at the output terminal; and
a sample-hold circuit having a first input terminal, a second input terminal and an output terminal, wherein the first input terminal is configured to receive the switching signal, the second input terminal is configured to receive the counting signal, and wherein based on the counting signal and the switching signal, the sample-hold circuit provides the time signal indicative of the ON time of the main switch at the output terminal.

11. The switching regulator of claim 2, wherein the upper limit and the lower limit of the minimum OFF time period is set according to the switching frequency.

12. The switching regulator of claim 2, wherein the offset value is set according to the resonant time of the energy storage component and the main switch.

13. A method of controlling a switching regulator, the regulator comprising a main switch operating at ON/OFF state and an energy storage component coupled to the main switch, wherein the OFF time of the main switch in each cycle is limited by a minimum OFF time period, and the energy storage component storing energy when the main switch is ON, and transferring the stored energy to the load when the main switch is OFF, the method comprising:
recording the OFF time period of the current switching cycle of the regulator;
updating the minimum OFF time period for the next switching cycle of the regulator in response to the difference between the OFF time period of the current switching cycle of the regulator and an offset value;
turning ON the main switch when a voltage across the main switch reaches a resonant valley after the minimum OFF time period ends; and
turning OFF the main switch when a current flowing through the energy storage component reaches a peak current limit.

14. The method of claim 13, wherein updating the minimum OFF time period for the next switching cycle of the regulator in response to the difference between the OFF time period of the current switching cycle of the regulator and an offset value comprises limiting the minimum OFF time period by an upper limit and a lower limit.

15. The method of claim 14, wherein updating the minimum OFF time period for the next switching cycle of the regulator in response to the OFF time period of the current switching cycle of the regulator further comprises:
recording the OFF time period of the current switching cycle of the regulator;
subtracting the offset value from the OFF time period of the current switching cycle of the regulator to get a difference signal;
comparing the difference signal to the upper limit and the lower limit of the minimum OFF time period to get a comparison signal; and
updating the minimum OFF time period for the next switching cycle of the regulator according to the comparison signal.

16. The method of claim 15, wherein updating the minimum OFF time period for the next switching cycle of the regulator according to the comparison result comprises:
setting the lower limit of the minimum OFF time period as the updated minimum OFF time signal for the next switching cycle of the regulator if the comparison signal indicates that the difference signal is smaller than the lower limit of the minimum OFF time period;
setting the upper limit of the minimum OFF time period as the updated minimum OFF time signal for the next switching cycle of the regulator if the comparison signal indicates that the difference signal is larger than the upper limit of the minimum OFF time period; and
setting the difference signal as the updated minimum OFF time period for the next switching cycle of the regulator if the comparison signal indicates that the difference signal is between the upper limit and the lower limit of the minimum OFF time period.

17. A method of controlling a switching regulator, the regulator comprising a main switch operating at ON/OFF state and an energy storage component coupled to the main switch, wherein the OFF time of the main switch in each cycle is limited by a minimum OFF time period, and the energy storage component storing energy when the main switch is ON, and transferring the stored energy to the load when the main switch is OFF, the method comprising:

recording the OFF time period of the current switching cycle of the regulator;

updating the minimum OFF time period for the next switching cycle of the regulator in response to the OFF time period of the current switching cycle of the regulator;

turning ON the main switch when a voltage across the main switch reaches a resonant valley after the minimum OFF time period ends; and turning OFF the main switch when a current flowing through the energy storage component reaches a peak current limit;

wherein updating the minimum OFF time period for the next switching cycle of the regulator in response to the OFF time period of the current switching cycle of the regulator further comprises:

dividing the time between an upper limit and a lower limit of the minimum OFF time period to several subintervals;

respectively mapping every subinterval to different minimum OFF time period; and setting the mapped minimum OFF time period of the subinterval for the next switching cycle of the regulator when the OFF time period of the current switching cycle of the regulator is in this subinterval.

18. A switching regulator, comprising:

an energy storage component configured to receive an input signal and supply an output signal to a load;

a main switch coupled to the energy storage component, wherein the energy storage component stores energy when the main switch is turned ON, and transfer the stored energy to the load when the main switch is turned OFF;

a control circuit configured to generate a switching signal to control the main switch in response to the sample signal, the feedback signal and the updated minimum OFF time period signal;

a timer configured to record the minimum OFF time period of the current switching cycle of the regulator in response to the switching signal;

a subtract circuit configured to generate a difference signal by subtract an offset value from the minimum OFF time period of the current switching cycle of the regulator;

a comparison circuit configured to generate comparison signals by comparing the difference signal with a lower limit and an upper limit; and a setting circuit configured to generate the updated minimum OFF time period signal in response to the comparison signals, the difference signal, the lower limit, and the upper limit.

19. The switching regulator of claim 18, wherein the setting circuit sets the lower limit as the updated minimum OFF time period signal if the comparison signal indicates that the difference signal is smaller than the lower limit;

the setting circuit sets the upper limit as the updated minimum OFF time period signal if the comparison signal indicates that the difference signal is larger than the upper limit; and the setting circuit sets the difference signal as the updated minimum OFF time period signal if the comparison signal indicates that the difference signal is between the upper limit and the lower limit.

20. The switching regulator of claim 18, wherein the timer comprises:

a counter having an input terminal and an output terminal, wherein the input terminal is configured to receive the switching signal, and wherein based on the switching signal, the counter starts counting when the main switch is turned OFF, and stops counting when the main switch is turned ON, and provides an counting signal at the output terminal; and a sample-hold circuit having a first input terminal, a second input terminal and an output terminal, wherein the first input terminal is configured to receive the switching signal, the second input terminal is configured to receive the counting signal, and wherein based on the counting signal and the switching signal, the sample-hold circuit provides the minimum OFF time period of the current switching cycle of the regulator at the output terminal.

* * * * *